US006792284B1

United States Patent
Dalsgaard et al.

(10) Patent No.: US 6,792,284 B1
(45) Date of Patent: Sep. 14, 2004

(54) METHOD AND ARRANGEMENT FOR MANAGING CELL RESELECTION IN A TERMINAL FOR A CELLULAR SYSTEM

(75) Inventors: Lars Dalsgaard, Oulu (FI); Antero Lundell, Turku (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/562,242

(22) Filed: Apr. 28, 2000

(30) Foreign Application Priority Data

Apr. 30, 1999  (FI) ................................................ 990987

(51) Int. Cl.⁷ ............................. H04B 7/00; H04Q 7/20
(52) U.S. Cl. ...................... 455/525; 455/436; 370/331
(58) Field of Search ................................. 455/525, 450, 455/435.1, 435.2, 435.3, 411, 436, 437, 451, 452.2, 453; 370/331, 332

(56) References Cited

U.S. PATENT DOCUMENTS

| | | | |
|---|---|---|---|
| 5,509,051 A | | 4/1996 | Barnett et al. ................. 379/59 |
| 6,041,231 A | * | 3/2000 | Suzuki .................... 455/435.1 |
| 6,546,251 B1 | * | 4/2003 | Dalsgaard et al. .......... 455/437 |

FOREIGN PATENT DOCUMENTS

| | | |
|---|---|---|
| WO | WO 97/32445 | 9/1997 |
| WO | WO 98/23122 | 5/1998 |
| WO | WO 99/01005 | 1/1999 |
| WO | WO 9901005 * | 1/1999 ............ H04Q/7/38 |
| WO | WO 99/67902 | 12/1999 |

OTHER PUBLICATIONS

ETSI 04.08, Version 6.2.0, parts 7.1 and 7.3.2.
ETSI 04.08, Version 6.2.0, part 9.2.9, table 9.2.11.
ETSI 04.08, Version 6.2.0, part 10.5.3.3, table 10.5.91.
ETSI 04.08, Version 6.2.0, part 10.5.2.20, figure 10.5.47;
ETSI 04.08, Version 6.2.0, section 10.5.2.20.
ETSI 04.08, Version 6.2.0, section 9.3.7.
ETSI 04.08, Version 6.2.0, part 10.5.4.11, figure 10.5.95.
ETSI 04.08, Version 6.2.0, part 10.5.4.11, table 10.5.123.
ETSI 05.08, Version 6.4.0. (newer version).

* cited by examiner

*Primary Examiner*—Vivian Chin
*Assistant Examiner*—Lewis G. West
(74) *Attorney, Agent, or Firm*—Perman & Green, LLP

(57) ABSTRACT

A method and arrangement is provided for controlling cell reselection by a terminal of a cellular radio system, in particular where the terminal is connected to a special service, such as a General Packet Radio Service. A base station transmits information to the terminal about whether the terminal may try cell reselection when required. This information is transmitted in the signaling message of a certain service, such as the GPRS service. A terminal connected to the certain service obtains information about whether it may directly change the serving base station to another base station offering a corresponding service, without temporarily accessing the signaling function of a lower level system. Cell reselection is facilitated such that loading on the terminal and on radio signaling is as low as possible.

34 Claims, 9 Drawing Sheets

METHOD AND ARRANGEMENT FOR MANAGING CELL RESELECTION IN A TERMINAL FOR A CELLULAR SYSTEM

BACKGROUND OF THE INVENTION

1. Field of the Invention

The object of the invention is an improved method and arrangement for permitting and performing cell reselection made by a terminal of a cellular radio system. The invention relates particularly to permitting and performing cell reselection in situations where the terminal requires a special service, such as GPRS (General Packet Radio Service).

2. Brief Description of Related Developments

In order to understand the background of the invention we first describe as examples prior art solutions for changing the active cell in the GSM system (Global System for Mobile telecommunications) and in the associated GPRS data packet transmission service. FIG. 1 shows the basic structure of a GSM network. In a mobile communications network there is at least one core network (CN) and one or more radio access networks (RAN). The core networks are formed by various exchange systems which in addition to versatile data transmission facilities can provide various value-added services. A core network comprises switching centres MSC (Mobile services Switching Centre), other network elements which in the GSM system are for instance the nodes associated with packet radio communication, the SGSN (Serving GPRS Support Node) and the GGSN (Gateway GPRS Support Node) and the associated transmission systems. The radio access networks are located between a core network and the terminals. A radio access network comprises base stations (BS) and a radio network controller (RNC). Each base station has a permanent connection to the respective radio access network controller. On the other hand the controllers of different radio access networks have a permanent connection to at least one node of the core network. One or more radio access networks can operate between the terminals and the core networks, and via a certain radio access network a terminal can communicate with several core networks.

A terminal of a cellular radio system always tries to select a certain base station and operate (camp) within its coverage area, or cell. Traditionally cell reselection was based on the measurement of strength of the received radio signal, either at the base station or at the terminal. For instance, in the GSM system each base station transmits a signal on the so called beacon frequency, which is different for neighboring base stations. In the GSM system a base station transmits on the so called BCCH channel (Broadcast Control Channel) the parameters p1 and p2 to the terminal, whereby these parameters are used to calculate of the so called C values. For instance the C1 value commonly used in the cellular GSM network is calculated from the equation below:

$C1 := (A-Max.(B,0))$, where

A:=average level of the received signal−p1 (dB)

B:=p2−maximum transmission power of the terminal (dB)

p1:=allowed minimum value for the received signal p2:=allowed maximum transmission power for a terminal.

In addition the terminals must measure the reception levels of the broadcast signals which they have received, so that they will be able to calculate the C1 value of each received cell. The cell which has the highest calculated C1 value is the most advantageous regarding the radio connection. In order to optimise cell reselection the network can also transmit additional parameters which enable the use of so called C2 values. A more detailed description is presented in the reference [11]. The base stations transmit to the terminals information about the BCCH frequencies used by the neighboring cells, so that the terminals will know on which frequencies they must listen in order to find the BCCH transmissions of the neighboring cells. In each cell the BCCH channel transmission also contains information about how the terminals can request random access in the respective cell in order to establish a connection.

The cells of the GSM system offer to its user the basic services: voice transmission, low-speed data transmission, and various short message services. The operation of the GSM system is standardised by ETSI (European Telecommunication Standardization Institute). The cells in the GSM system are interleaved regarding their coverage areas, so that at the cell borders it is necessary to decide which cell the terminal in question shall use. In non-active mode the terminal decides which cell to camp on, but in active mode the decision is influenced, in addition to the quality of the connection, also by other factors, for instance by the loading degrees of the cells of the network. In the dedicated mode the core network decides which of the two cells the terminal shall use, and the timing of the cell change, which it informs to the terminal. According to the ETSI standard, in the dedicated mode terminal can not independently access the service of another cell. In the idle mode the terminal decides, on the basis of the C1/C2 values which it has calculated for a number of neighbor cells, to which cell it shall belong. The actual timing of the cell change either in the dedicated mode or in the idle mode is not very important regarding the terminal, because all cells of the system normally provide the same basic services, and the user of the terminal will not notice the change from one cell to another.

However, new services are being constructed on the platform provided by the GSM system, so that these new services are able to provide various value-added services to the user of a terminals. These services might not be provided over the whole coverage area of the GSM network, but only in some limited areas. One such service could be GPRS. In the GPRS service area the user of a terminal can choose whether he uses the basic GSM services or whether he utilises the value-added services provided by GPRS. FIG. 2 shows the provision of a GPRS service over a limited area. Of the cells in FIG. 2 the cells 1, 3, 6 and 8 offer the GPRS service in their areas, but in all other cells only basic GSM services are available. The figure also shows the path of a mobile terminal from point P1 to point P7. In the active mode at the cell border regions the cell change may be controlled by the network, or it might be controlled by the terminal. Thus the following situation for a terminal could occur: the terminal obtains GPRS services on the distances P1→P2, P3→P4 and P6→P7. On the distances P2→P3, and P4→P5→P6 only the basic GSM services are available. If the user started in P1 with an active GPRS connection, he will in the worst case notice that the GPRS services are interrupted for a shorter or longer period of time during an active session when moving towards P7. The user will be surprised by the service interruptions, because in the user's opinion he is moving within the GPRS coverage area made known by the service operator. Another example of an undesirable case is that the terminal can not establish a desired GPRS connection to a cell supporting the GPRS service when the terminal is located in an unsuitable place, for instance in FIG. 2, on the distance P2→P3. This situation could occur even when the terminal is located clearly within the GPRS coverage area defined by the network service, if the terminal, due to C1/C2 values are forced to reselect to a cell not supporting GPRS service. A third inconvenient case is the point P7, which is located at the border of the cells 6 and 7. In the worst case the terminal has to make repeated cell changes between a cell supporting GPRS service and a cell not supporting GPRS service. This means that the user will experience the situation where he at certain times has GPRS service available and at other times does not have GPRS service available, even though he is at the location all the time.

The GPRS standards and the proposed revisions to them have tried to solve the above presented problem in the following way. The network permits that all terminals supporting GPRS and camping in a GPRS cell can favour certain cells at the expense of other cells. For this purpose the network can use C31/C32 values, which are described in more detail in the reference [11]. Thus a terminal stays as a user of services of a certain cell, even when the received power from a beacon frequency of a neighboring cell is higher than that of the current serving cell according to the terminal's measurements, provided that the C-values of the current cell fulfills certain criteria and that the serving cell has enough transmission capacity on hand.

In the example of FIG. 2 the cells 1, 3, 6 and 8 could be such favourable cells. The parameters enabling operation of this kind are called offset parameters. In basic GSM the different cells transmit their offset parameters on their beacon frequency. The offset parameters for each neighboring cell might have different values. The terminal reads these parameters for a certain selection of neighbor cells so that the terminal can calculate the C values for each of these cells. In a GPRS supporting cell the terminal might receive all necessary offset parameters, also those for neighboring cells, from the current serving cells broadcast information, so that the terminal in this case can calculate the necessary C-values for selected neighbors, without reading the neighbors broadcast information on their beacon frequencies. In either way the terminal can use the calculated C-values to determine if it can remain a user of its current cell, even though the signal level of a neighboring cell according to the power level measurements is higher than the signal of the current cell. This is true so as long as the C value of another cell does not exceed the C value of the cell in question.

A prior art network transmits said offset parameters in the system information messages on the BCCH channels transmitted by the base stations of the cells; in the basic GSM system these messages are called SI messages and in the GPRS services they are called PSI messages (Packet System Information message). However, the level of the received signal varies in an unpredictable way due to the characteristics of the transmission path. Thus the result from the calculation of the C values can also vary in an unpredictable way from one location to the next or just in time, and it is therefore difficult to obtain a 100% certainty about the complete or precise coverage area of each cell. From time to time this can cause undesired areas, a kind of holes, in a planned continuous GPRS coverage area of a number of cells, whereby said service may be surprisingly missing. Thus, only by favouring cells in the case of FIG. 2 it is not possible to guarantee with a 100% certainty that GPRS service will be available from point P1 to point P7—or maybe even within the area covered by cells 1,3,6 and 8.

Because the service levels of the neighbor cells are not checked in advance when operating in a prior art GSM network, then due to a cell reselection the terminal may enter a cell which does not offer the GPRS service required by the terminal. The example case in FIG. 3 presents the operation according to the specifications when a terminal performs a cell change. In the initial situation, step 30, the terminal can be either in the idle state or in the active state. In step 31 the terminal examines the need to change the serving cell. The best of six neighbor cells in the terminal's list of neighbor cells is selected, if a need to change the cell is detected, step 32. However, before the selection there is no check about which services the selected cell supports. In step 33 the terminal performs configuration to the new cell, whereby the terminal shifts to operate on the frequencies of the new cell and obeys the timing information given by the cell. In step 34 the terminal receives the system information SI or PSI of the new cell. In step 35 it is examined whether sufficiently information has been obtained from the new cell. If not, there is a return to step 34. If all required information has been received, then there is a move to step 36, where a test is made whether the selected cell supports the GPRS service. If the cell supports GPRS there is a return to step 30 and the operation the terminal may continue its GPRS service as normally. If the selected cell does not support the GPRS service there is a move to step 37, where the desired service is not available to the terminal and therefore the terminal may not continue its GPRS service. Thus the prior art operation supports only the provision of cell based GPRS services, even though the user rather would require a regional GPRS service.

SUMMARY OF THE INVENTION

The object of the presented solution is to present a method and an arrangement for avoiding the disadvantages of prior art. An essential idea of the invention is that the network knows the service level required by a particular terminal as well as the service level and loading situation of the terminal's current cell and its neighbor cells. On the basis of this information the network transmits to the terminal via the base station serving the terminal, in a so called system information message, information about whether the terminal is allowed to perform a special cell access request when it desires. This request from the terminal informs the serving base station about its desire, to utilize a specific service of its current cell or a neighbor cell. In this way the network might provide the service in the current cell or allow or command the terminal to change serving cell, so that the terminal in question would get the service required by it. This information is transmitted to the terminal most preferably in the signalling message of a certain service, to which certain service the terminal is connected. In the same connection or message the terminal is also given information about whether it can favour cells providing GPRS service, at the expense of the basic GSM cells. Favouring can mean that the terminal remains a user of the current cell or changes to be a user of a new cell (cell reselection) supporting GPRS.

For instance, when the terminal operates in a cell supporting the GPRS service, then the information about whether the terminal when required is allowed to transmit a special cell access request to the network is transmitted in the PSI message of the packet channel of the GPRS system. In the simplest case the invention can be realised in the GPRS system by adding information elements to the PSI signalling message of the packet channel, whereby these added elements tell whether the terminal can transmit, when required, a special cell access request to its current cell. Also it might be indicated in the serving system information whether the use of the special access request may is allowed in a neighboring cell if/when this neighboring cell becomed the serving cell. If the terminal does not operate in a special service, such as in the GPRS service, then the information can be transmitted in the system information message of the basic system, such as in the SI message.

Thanks to the invention a terminal operating in a certain service can remain a user of its current cell, or directly change the current serving cell to another cell providing the corresponding service, without making intermediate cell reselections to cells possibly not supporting the required service. Thus for instance a terminal operating in the GPRS service does not have to switch-over to receive the system information messages on the basic GSM channels transmitted by neighbor base stations in connection with cell reselection, but the terminal can directly access, on the GPRS level, a new cell providing the GPRS service.

The operation of the terminal in order to find a new cell can be directed more efficiently than in the prior art if the terminal gets a permission according to the invention to transmit, when required, a special cell access request to its cell, and when it has got said permission, then it gets information from the network about which of the neighbor cells are available to the terminal for cell change. In an arrangement according to the invention the terminal transmits to its current base station, associated with a special cell access request, the identification and level information which it has measured concerning its neighbor cells. According to the needs the terminal maintains different lists of such neighboring cells, which it may access in the near future.

A method according to the invention for controlling the cell reselection of a terminal is characterised in that the terminal is authorised to perform a special cell access, and that the for the cell reselection required by the special cell access the terminal transmits to the base station an additional message which comprises the results of the neighbor cell measurements made by the terminal.

A base station according to the invention in a cellular radio system is characterised in that it comprises means for processing a special cell access request, it comprises information about which base stations are available to the terminal so that it can move the terminal to be a user/remain a user of one of these base station, and it is arranged to include said information and that the terminal is permitted both to request a special cell access and to perform a cell reselection, into the signalling messages addressed to the terminal.

A terminal according to the invention in a cellular radio system is characterised in that it is provided with means for making a special cell access request to the base station of the current cell, means for receiving and interpreting cell reselection information from the signalling messages transmitted by the base station, and means for performing said cell reselection on the basis of said information.

The invention further relates to a cellular radio system which is characterised in that it comprises information available to the base station, which information concerns a number of neighbor cells adjacent to the cell of said base station, and which information contains information about the service level provided to the terminals by the neighbor cells, whereby said system is arranged, when a special cell access request has been received, to transmit said information in a signalling message from the base station to the terminal for selecting a new serving cell.

Some advantageous embodiments of the invention are presented in the dependent claims.

An advantage of the invention is that the network can, when required, give a single terminal in advance the authorisation to stay as a user of its current cell or to move to be a user of a cell which offers GPRS services. In doing so it is possible to provide value-added services regionally, instead of the provision of a service based on individual cells. For the user this means that inconvenient service breaks will decrease substantially when the invention is used.

According to the invention a particular terminal is able to transmit a special cell access request to its current cell and, when required, to make a cell reselection according to the standard when the terminal is in the so called idle state, in which there is no active data transmission between the terminal and the base station, or according to the invention it can also be made during active data transmission. This could make the cell reselection faster and also make the cell reselection more flexible compared to prior art method.

The invention also furthers the focusing of the cell reselection so that the loading on the terminal and on the radio signalling caused by measurements and message reception regarding any new cells is as low as possible.

A further advantage of the invention is that when the resources of a certain cell are exhausted, then another cell can be allocated to the terminal, and thus a broader service can be offered to the terminal.

BRIEF DESCRIPTION OF THE DRAWINGS

The invention is described in detail below. In the description reference is made to the enclosed figures, in which.

DETAILED DESCRIPTION OF THE PREFERRED EMBODIMENT(S)

Figure 1:
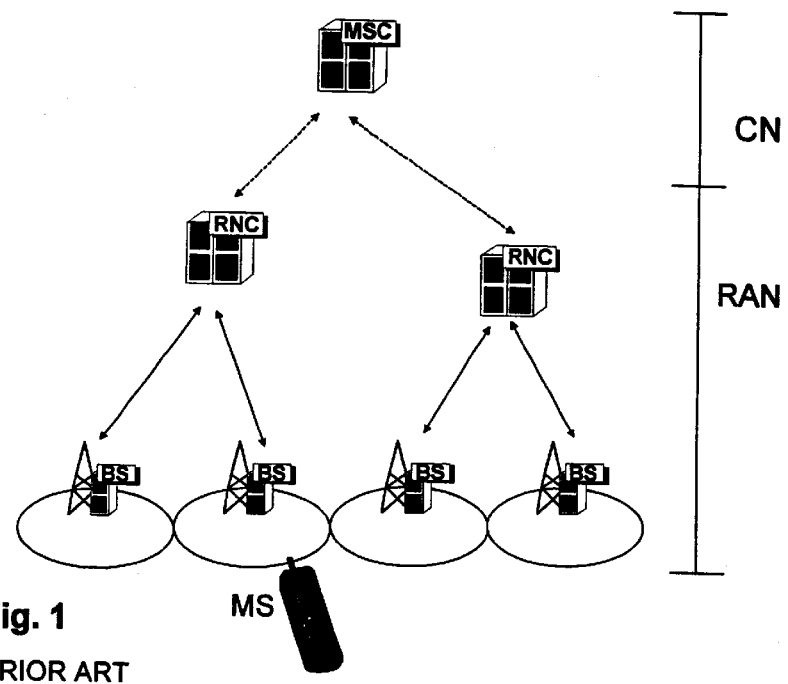
FIG. 1 shows the basic parts of a GSM network.
Figure 2:
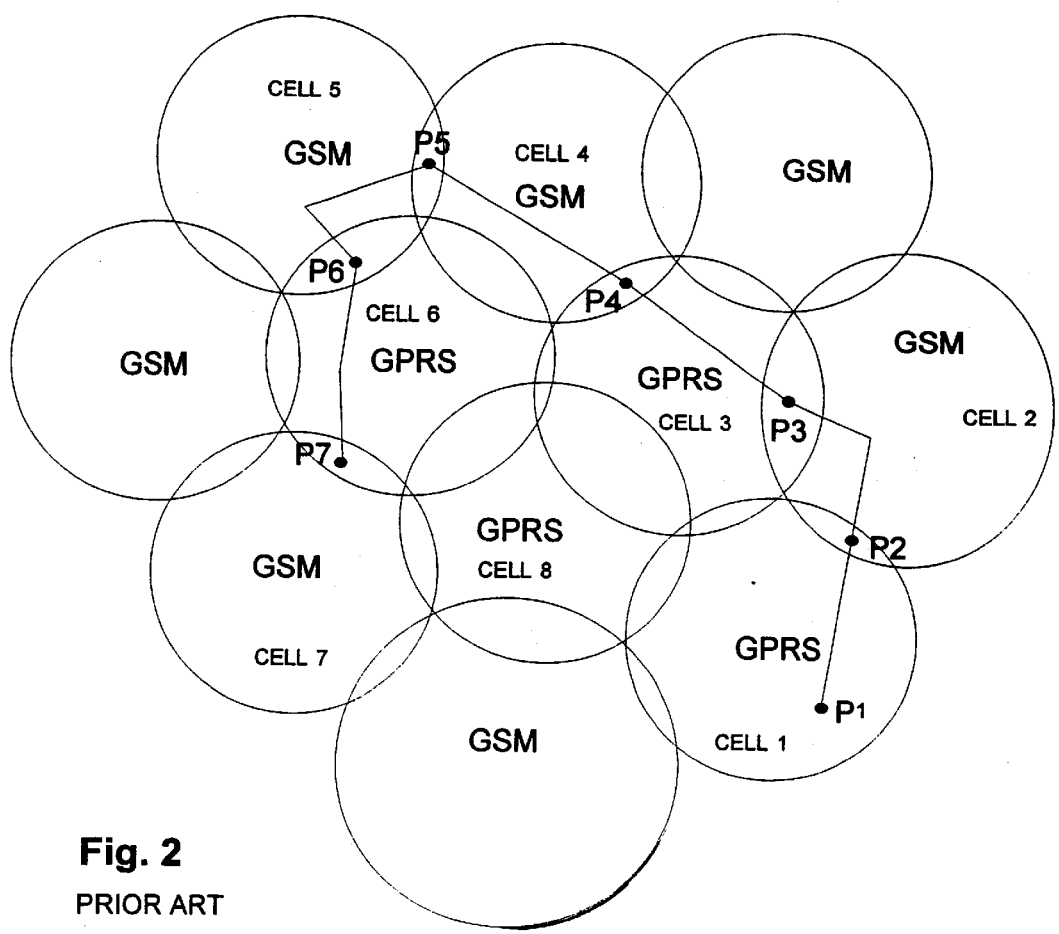
FIG. 2 shows a prior art cell reselection in a GSM, GPRS system.
Figure 3:
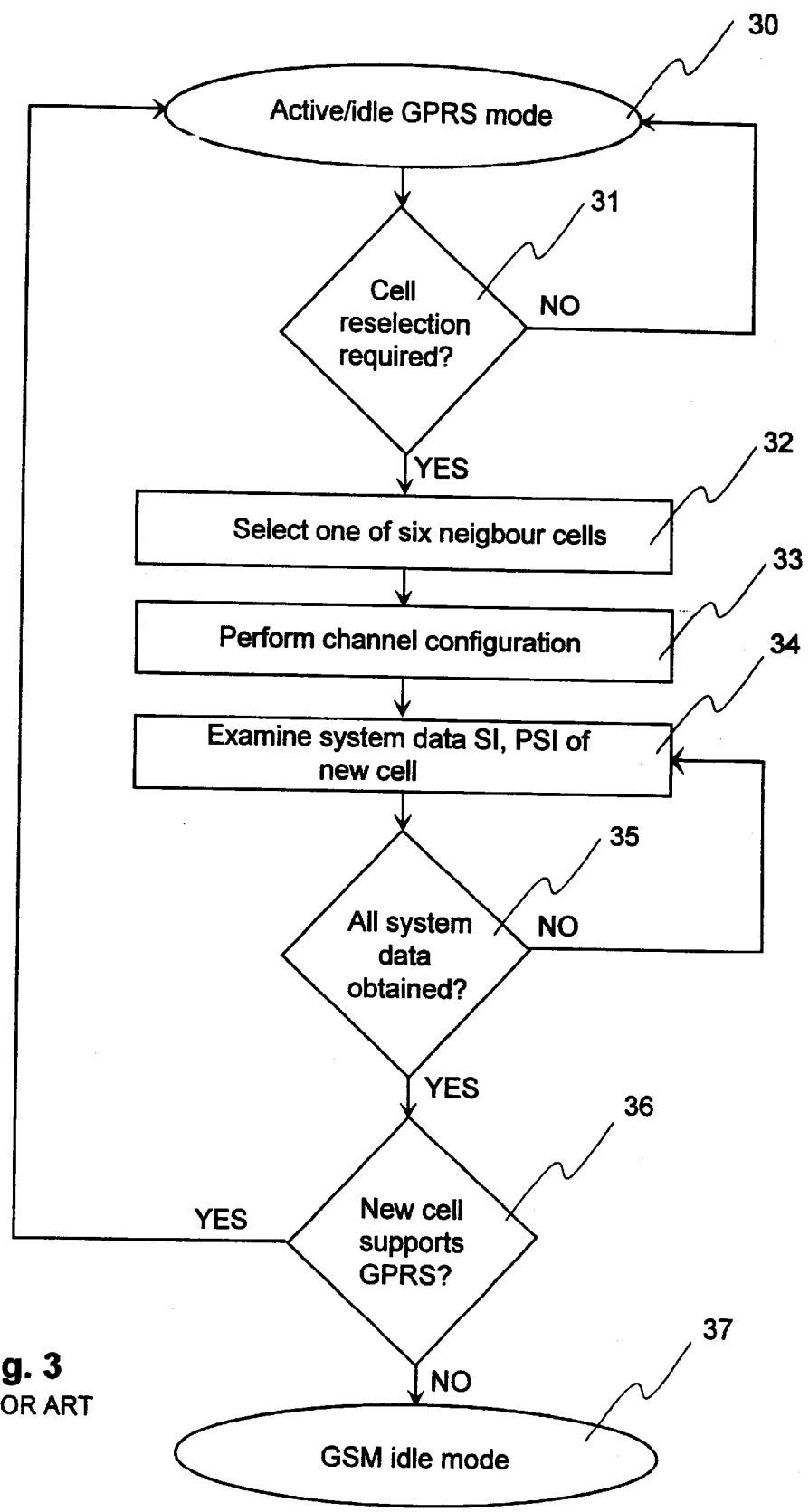
FIG. 3 shows in a flow diagram a prior art cell reselection.

The contents of the FIGS. 1 to 3 was presented in connection with the description of prior art.

In the following we describe how the special cell access request according to the first embodiment of the invention is used in the GSM system when no GPRS service is assigned to the terminal in the current cell, whereby it is required that the network is able to transmit to the terminal information i.a. about whether the terminal in question is permitted to perform a special cell access request and about which other conditions the connection must fulfill in order to allow the special cell access request to be transmitted to the current cell. Below we present an example showing how this information can be transmitted to a terminal in the GSM system in a possible SI message or possibly in the GPRS service specific system information messages—PSI messages, as expressed by its information elements:

```
{0|1<ADDITIONAL CELL SERVICE INFORMATION :bit( )>
    <Special cell access request allowed : bit (1)
    {0|1 <Rxlevel limit : bit( )>}
    <Tx or Idle mode : bit (2)>
    <Area indication : bit(2)>
    {0
            <Rxlevel offset : bit( )>
    |1
            <Rxlevel offset idle : bit( )
            <Rxlevel offset transfer : bit( )>
    }
```

In the message "Special cell access request allowed" the bit indicates whether the network permits or not that the terminal in question transmits the special cell access request to the base station of its current cell. The next record "Rxlevel limit" indicates the limit of the measured signal level of the received beacon frequency of the cell, above which limit the signal level must bein order for the transmission of the special cell access request to be allowed. The field is optional and can be used for indicating a limit value either for the serving cell or the cell(s) which is supporting the requested service and which the terminal is requesting the service from. The record "Tx or Idle mode" indicates whether the terminal in question is allowed to use service based cell selection or change either in the idle mode or in the active mode, or whether said operation is possible in both modes. The record "Area Indication" contains information about whether the possibility to transmit a special cell access request or in general the additional cell service information is cell based or regional. The next records informs the terminal the offset parameters of the reception level concerning both the idle mode and the active mode. These parameters are to be used in connection with e.g. service based cell change or permission to stay on a particular cell due to the service offered. On the basis of the information which the terminal has obtained it is able to transmit a special cell access request, either to indicate that it will stay as a user in the current cell if the terminal, based on the measurements it has made, operates on an acceptable level regarding the signal levels in the desired cell, as estimated with the aid of the offset parameters, or to take measures to change from the current cell to another cell supporting the GPRS service.

Figure 4:
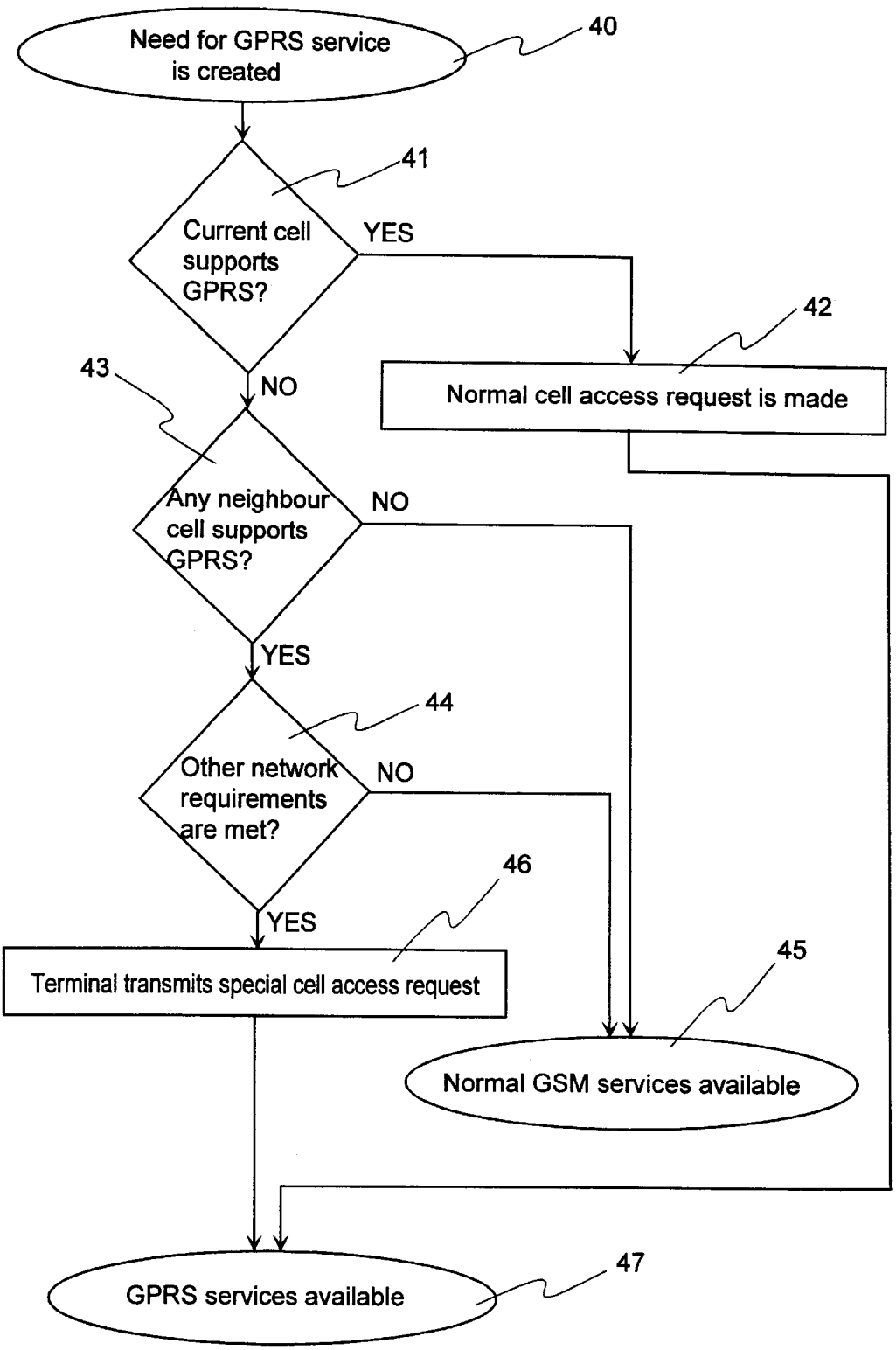
FIG. 4 shows a special cell access request according to the invention in a flow diagram.

FIG. 4 shows in a flow diagram how the special cell access request required by a terminal is made in a case according to the invention utilising the basic GSM service. The GPRS service need is created in step 40. Then it is examined whether the current serving cell of the terminal supports the GPRS services, step 41. If the cell supports the GPRS services then step 42 makes the normal access request, and when the connection is created there is step 47, where the desired GPRS services are available to the terminal. If it is determined in step 41 that the current cell does not support GPRS services, then in step 43 there is examined the possibilities of a number of adjacent cells to provide the GPRS services. The number of the examined cells may vary. If there is determined in step 43 that none of the possible neighbor cells provides GPRS service, then the terminal ends up to operate in state 45, where only basic GSM services are available. If step 43 finds a neighbor cell which supports GPRS, then in the next step 44 there is examined whether the other requirements on the network connection set by the network are met. If they are not met for any of the neighbor cells, then we end up in step 45, where the normal basic GSM services are available. If a suitable neighbor cell supporting the GPRS service is found among the neighbor cells in step 44, then the terminal is permitted to transmit the special cell access request to its cell in step 46. After having received a response to the special cell access request from the network a cell reselection according to the standard might be performed depending on content of the network response. If permission to perform cell reselection is granted the terminal moves to be a user of the selected neighbor cell where it is offered the GPRS services available in said cell, step 47. In state 46 the terminal might instead of transmitting the special cell service request to the network, perform a normal cell change to one of the cells found acceptable in state 44, if this is permitted by the network according to the optional reception level limits set in the additional cell service information information element.

The above described special cell access request can be realized either by adding extra messages to the available signalling, or by adding parts to already existing signalling procedures. Said added information can be transmitted in connection with the access request defined in the standards, and it may contain information about the desired GPRS service and the identity and level data of the terminal's neighbor cells measured by it.

Figure 5A:
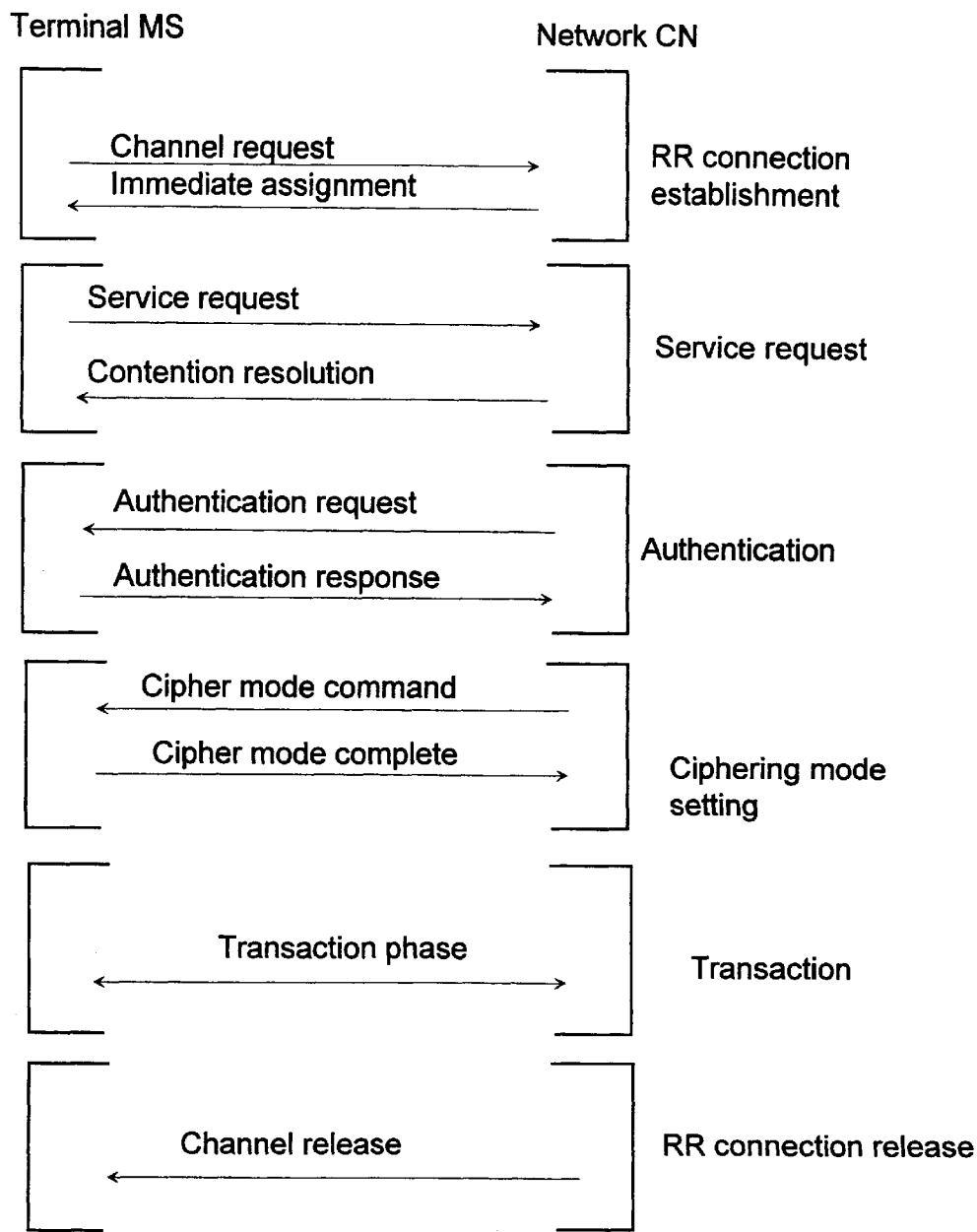
FIG. 5a shows in a signal diagram how the connection between a terminal and the network is established, maintained and disconnected when operating in a cell supporting GSM services.
Figure 5B:
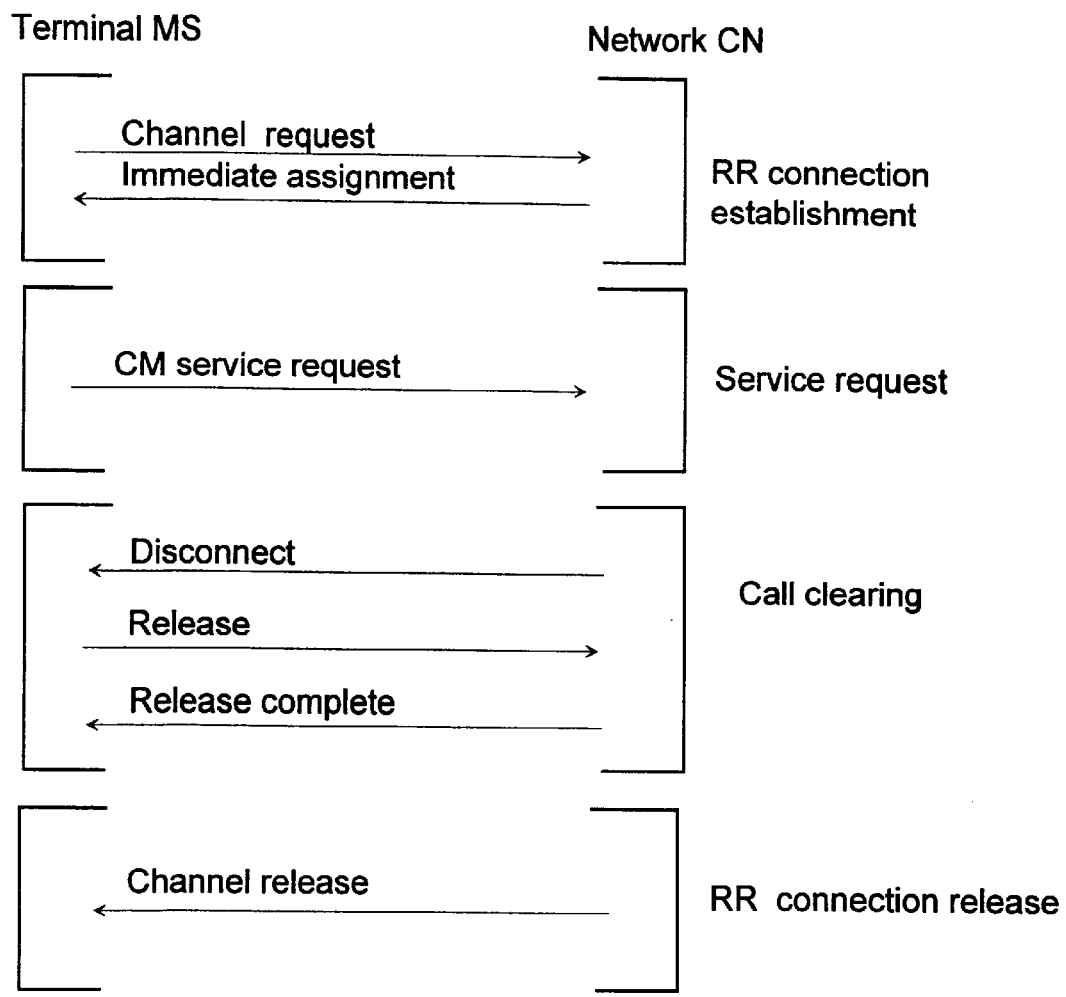
FIG. 5b shows in a signal diagram how the connection between the terminal and the network is established and disconnected when operating according to the invention in a cell not supporting GPRS service but supporting the special access request.

FIG. 5a shows how a connection is basically formed in the GSM system when the need to establish a connection originates in the terminal. FIG. 5b shows how information about the possibility to perform a special cell access request can be included in the signalling regarding service requests, which signalling is defined in the ETSI standard, reference [1]. In the example of the FIG. 5a (basic GSM case) the initiative to create a connection comes from the terminal. The terminal transmits a channel request to the network. The network responds with an immediate assignment, and thus the radio connection between the terminal and the network has been created. In the next step the terminal transmits a CM service request to the network. The special cell access request according to the invention can be included in this CM servicel request message, in a manner presented later on. When the network has received the service request, then in a possible contention resolution it first solves in which order the network services are assigned to each of the competing terminals. Then on the initiative of the network there is performed an authentication where the terminal participating in the connection is identified. The terminal responds to the network's request with its own identity. Then there is made a decision concerning any ciphering of the connection, and the next phase is transaction phase, and finally the network makes channel release when the need for communication has terminated.

As said a possible support of the special cell access request can be be realized easily by including some additional information in the already existing signalling. In the example of the FIG. 5b the special cell access procedure is started as described in the connection with the disclosure of the FIG. 5a, but after the network has decided on a response to the request, this response can be transmitted to the terminal in a disconnect message in the channel release phase. The disconnection procedure used is described more exact later on.

In the above mentioned process (FIG. 5a) the special cell access request can be included in the message s defined by the ETSI standards. Table 1 shows which information elements can be included in the service request message according to the invention. Table 1 is based on a table presented in the ETSI publication, reference [2].

TABLE 1

"CM SERVICE REQUEST"-message

| IEI | Information element | Presence | Format | Length |
|---|---|---|---|---|
|  | Mobility management protocol discriminator | M | V | 1/2 |
|  | Skip indicator | M | V | 1/2 |
|  | CM Service Request message type | M | V | 1 |
|  | CM Service type | M | V | 1/2 |
|  | Ciphering key sequence number | M | V | 1/2 |
|  | Mobile station class mark | M | LV | 4 |
|  | Mobile identity | M | LV | 2–9 |
| 8- | Priority | O | TV | 1 |
|  | Special cell access | O | TV | 1–10 |

The information element "CM Service type" is transformed into an element according to table 2 presented below. Further an information element "Special cell access" is added to the message, whereby this element has a length of up to ten octets and contents, which are shown below in table 3.

The contents of the information element "CM Service Request" according to the existing standard is presented in the ETSI standard, reference [3]. According to the invention the contents of said table is changed to conform to the table 2 by adding to it one information element comprising four bits. Table 2 shows as an example one possible bit combination "1-1-0-0" of the octet in question concerning the bits 1 to 4, which can express the special cell access request in question desired by the terminal.

TABLE 2

The information element "CM Service Type" according to the invention
Service type (octet 1)

| Bits | | | | |
|---|---|---|---|---|
| 4 | 3 | 2 | 1 | |
| 0 | 0 | 0 | 1 | Mobile originating call establishment or packet mode connection establishment |
| 0 | 0 | 1 | 0 | Emergency call establishment |
| 0 | 1 | 0 | 0 | Short message service |
| 1 | 0 | 0 | 0 | Supplementary service activation |
| 1 | 0 | 0 | 1 | Voice group call establishment |
| 1 | 0 | 1 | 0 | Voice broadcast call establishment |
| 1 | 1 | 0 | 0 | Special cell access Request |

All other values are reserved.

In addition to the special cell access request in the table above the method according to the invention requires that a new information element is added to the service request, whereby the length of this element is preferably ten octets. The new information element according to the invention is called "Special cell access". This new element can preferably contain information about which type of service is desired by the terminal, the level information RXLEV concerning the neighbor cells measured on the beacon frequency by the terminal in the idle state, and the base station identity code (BSIC) of the neighbor cells. In a system according to the invention the terminal transmits information about the most important neighbor cells to the network. In this example the most important neighbors could be those providing the requested service by the terminal and which fulfills the restrictions set by the network. Preferably they can be restricted to the four base stations which are the most suitable, whereby the information about them can be transmitted in a message with the length of ten octets.

Table 3 shows as an example the contents of the new information element "special cell access" according to the invention, which is modified from the table presented

TABLE 3

The information element "Special cell access" according to the invention

| 8 | 7 | 6 | 5 | 4 | 3 | 2 | 1 | |
|---|---|---|---|---|---|---|---|---|
| Special cell Access IEI | | | | spare | | access request | | octet 1 |
| NO-NCELL-M | | | | RXLEV NCELL 1 | | | | octet 2 |
| BCCH-FREQ-NCELL- 1 | | | | | BSIC-NCELL-1 (high part) | | | octet 3 |
| BSICC-NCELL-1 (low part) | | | | RXLEV-NCELL-2 | | | | octet 4 |
| RXLEV NCELL 2 (low part) | | BCCH-FREQ-NCELL-2 | | | | BSIC-NCELL- 2 (high part) | | octet 5 |
| BSIC-NCELL-2 (high part) | | | | RXLEV-NCELL-3 | | | | octet 6 |
| RXLEV- NCELL- 3 (low part) | | BCCH-FREQ-NCELL-3 | | | | BSIC- NCEL L-3 (high part) | | octet 7 |
| BSIC-NCELL-3 (high part) | | | | RXLEV-NCELL-4 (high part) | | | | octet 8 |
| RXLEV-NCELL-4 (low part) | | | | BCCH-FREQ-NCELL-4 | | | | octet 9 |
| BSIC-NCELL-4 | | | | | | Spare | | octet 10 |

The special cell access request message presented in table 3 contains ten octets. The first three bits of the first octet can indicate that this concerns a GPRS service request. Said bit combination is presented in table 4. The two first bits of the second octet indicate how many neighbors' information the terminal wants to transmit to the network. In the presented example case the number of octets limits said neighbor cells to be four. By adding more octets to the message it will be possible to transmit information of even more neighbor cells. The other bits of the octet transmit the level measurement information RXLEV-NCELL-1 of the neighbor cell 1. The five last bits of the third octet transmit the frequency information BCCH-FREQ-NCELL-1 of the BCCH transmissions of the neighbor cell 1. The three first bits of the third octet transmit three bits BSIC-NCELL-1 of the identity of the neighbor cell 1. The three last bits of the fourth octet transmit the last three bits of the identity of the neighbor cell 1. The bits at the beginning of the fourth octet are used to transmit the initial part of the level measurement information RXLEV-NCELL-2 of the neighbor cell 2, and the other bits of the level measurement information of said neighbor cell 2 are transmitted at the end of the octet five. The neighbor cell information transmission is continued according to the above described order, so that the identity BSIC-NCELL-4 of the fourth neighbor cell is transmitted by the last six bits of the tenth octet. Two unused bits are left at the beginning of the tenth octet. The information to be transmitted is encoded as defined in the ETSI standard, reference [5]. Above example is only one possible way of indicating to the base station the necessary information in order for the network to be able to identify the neighboring base station.

The three first bits of the first octet define the nature of the desired access request. Table 4 shows one possible available bit combination. Also other bit combinations are possible. By transmitting the bit combination "0-0-1" in said octet as described the terminal indicates that it desires to access the GPRS service. Also other services which will be used in the future can be identified by different combinations of said bits.

TABLE 4

Contents of the information element "Access request" in octet 1
Access request (octet 1)

| Bits | | | |
|---|---|---|---|
| 3 | 2 | 1 | |
| 0 | 0 | 0 | Reserved |
| 0 | 0 | 1 | Packet data access |

All other values are reserved.

The network can respond in many different ways to a special cell access request transmitted by a terminal. The network can bar the terminal from the special service access request service: totally, partially, during a certain time period; or it can permit a free use of the service. The network can combine said messages with the normal signalling messages addressed to the terminal. One advantageous way is to use the normal disconnect procedure (FIG. 5b), which is described in the ETSI standard, reference [6]. The signalling according to the standard can be used in any of the situations mentioned above. A message indicating the cause of the disconnection is associated with this signalling; the information elements of the cause message are described in the ETSI standard, reference [7], which is also presented as table 5 below.

TABLE 5

Contents of the information element "Disconnection cause"

| 8 | 7 | 6 | 5 | 4 | 3 | 2 | 1 | |
|---|---|---|---|---|---|---|---|---|
| | | | Cause IEI | | | | | octet 1 |
| | | Length of cause contents | | | | | | octet 2 |
| 0/1 | | coding | | 0 | | location | | octet 3 |

TABLE 5-continued

Contents of the information element "Disconnection cause"

| 8 | 7 | 6 | 5 | 4 | 3 | 2 | 1 | |
|---|---|---|---|---|---|---|---|---|
| ext 1 | standard | spare recommendation | | | | | | octet 3a* |
| ext 1 | | | cause value | | | | | octet 4 |
| ext | | diagnostic(s) if any | | | | | | octet 5* |
| | | | | | | | | octet N* |

The modifications required by the method according to the invention are made in the cause value list which is transmitted in the octet 4 of the disconnection message. The ETSI standard contains tens of different cause values. Two new codes are added to the cause values when the method according to the invention is used; these new codes enable the operation of the special cell access request in a cellular GSM network. Table 6 shows the additions according to the invention which must be made to the contents of the table shown in the ETSI standard, reference [8]. The presented table 6 does not contain all cause values defined in the standard. The operation according to the invention is achieved by adding the cause values nos. 7 and 45 to the list according to the table.

The cause value no. 45 indicates to the terminal that the requested service, here GPRS service, desired by it is not available. When the network has transmitted this message it may act in different ways. For instance, the network can communicate to the terminal in question that said terminal will not be able to repeat the special cell access request as long as it camps within the area of the current cell. Another alternative is that the terminal must wait a certain time before it may repeat the special cell access request to the network.

The new cause value no. 7 of the disconnection message can be used in a situation where the network permits the terminal to access a cell which supports the requested service, here GPRS service, or to continue as a user of its former cell supporting the GPRS, if the operation is at a level permitted by the offset parameter. In the same message the network also transmits to the terminal information about which cell it will access, when required. This information regarding the new cell is transmitted in the octets 5 and 6 of table 5, for instance so that the BSIC code of the new cell is transmitted in the bits 1 to 6 of the octet 5. The bits 7 and 8 of octet 5 and the bits 1 to 8 of octet 6 transmit the beacon frequency used by the new cell. Then there is a so called cell reselection, which in a system according to the invention can be made according to the existing standard.

TABLE 6

Cause values used in connection with Disconnect messages

| Cause class | | | | | | | Cause value | | |
|---|---|---|---|---|---|---|---|---|---|
| 7 | 6 | 5 | 4 | 3 | 2 | 1 | Cause num. | Cause | Diagnostics | Remarks |
| 0 | 0 | 0 | 0 | 0 | 0 | 1 | 1 | Unassigned number (unallocated) | Note 9 |
| 0 | 0 | 0 | 0 | 0 | 1 | 1 | 3 | No route to destination | Note 9 |

TABLE 6-continued

Cause values used in connection with Disconnect messages

| Cause class | | | Cause value | | | | Cause num. | Cause | Diagnostics | Remarks |
|---|---|---|---|---|---|---|---|---|---|---|
| 7 | 6 | 5 | 4 | 3 | 2 | 1 | | | | |
| 0 | 0 | 0 | 0 | 1 | 1 | 0 | 6 | Channel unacceptable | — | |
| 0 | 0 | 0 | 0 | 1 | 1 | 1 | 7 | cell reselect order | Note x | |
| 0 | 0 | 0 | 1 | 0 | 0 | 0 | 8 | Operator determined barring | — | |
| | | | | | | | 16 | | | |
| | | | | | | | 31 | | | |
| | | | | | | | 31 | | | |
| 0 | 1 | 0 | 0 | 0 | 1 | 0 | 34 | No circuit/ channel available | Note 1 | |
| 0 | 1 | 0 | 0 | 1 | 1 | 0 | 38 | Network out of order | — | |
| 0 | 1 | 0 | 1 | 0 | 0 | 1 | 41 | Temporary failure | — | |
| 0 | 1 | 0 | 1 | 0 | 1 | 0 | 42 | Switching equipment congestion | — | |
| 0 | 1 | 0 | 1 | 0 | 1 | 1 | 43 | Access information discarded | Note 6 | |
| 0 | 1 | 0 | 1 | 1 | 0 | 0 | 44 | requested circuit/channel not avalaible | — | |
| 0 | 1 | 0 | 1 | 1 | 0 | 1 | 45 | requested packet service/cell request not available | — | |
| 0 | 1 | 0 | 1 | 1 | 1 | 1 | 47 | Resources unavailable, unspecified | — | |
| | | | | | | | 49 | | | |

Figure 5C:
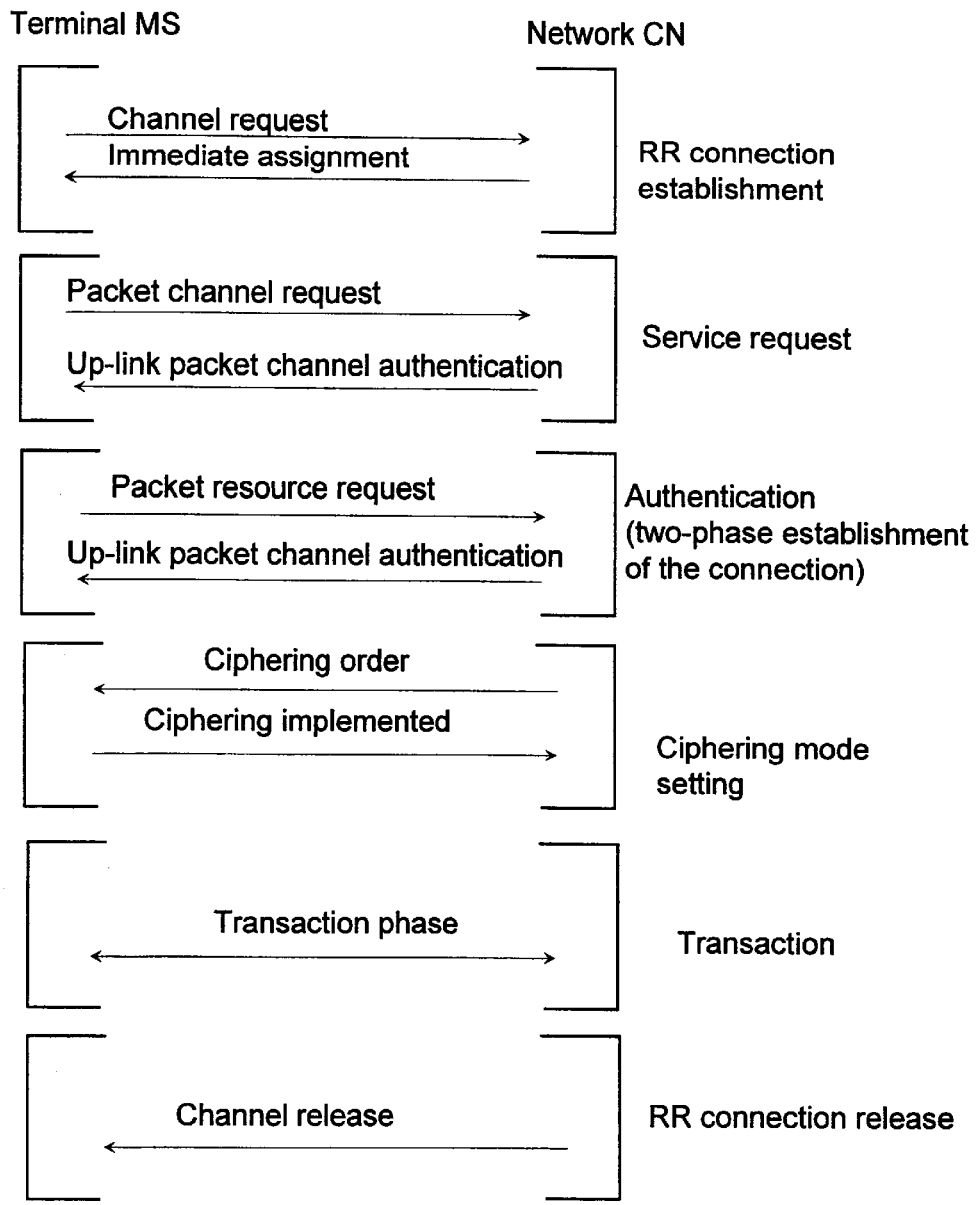
FIG. 5c shows in a signal diagram how the connection between a terminal and the network is established, maintained and disconnected when operating in a manner according to prior art in a cell supporting GPRS services.

FIG. 5c shows how a connection is established according to prior art in a case where the terminal is connected to a cell supporting GPRS packet data transmission service. When the connection has been established according to the standard the terminal transmits to the network on the PRACH channel (Packet Random Access CHannel) a request to establish the actual packet mode connection, as defined in the ETSI standards, references [9] and [10]. On the basis of the loading situation the network may either accept the packet mode connection access request, or reject it. If the access request is accepted the operation continues in the manner defined by the standards, whereby the network transmits on the PAGCH channel (Paging and Access Grant CHannel) to the terminal a permission to assign resources in order to transmit data packets towards the network. According to the standards the operation in question may be performed either in one step or in two steps, but that does not affect the process according to the invention. If the resources of the cell in question at the moment are insufficient for establishing a connection, then no resources can be assigned to be used by the terminal. Then the terminal must wait for a period specified by the network before it may make a new request to establish a connection in the cell in question.

Figure 5D:
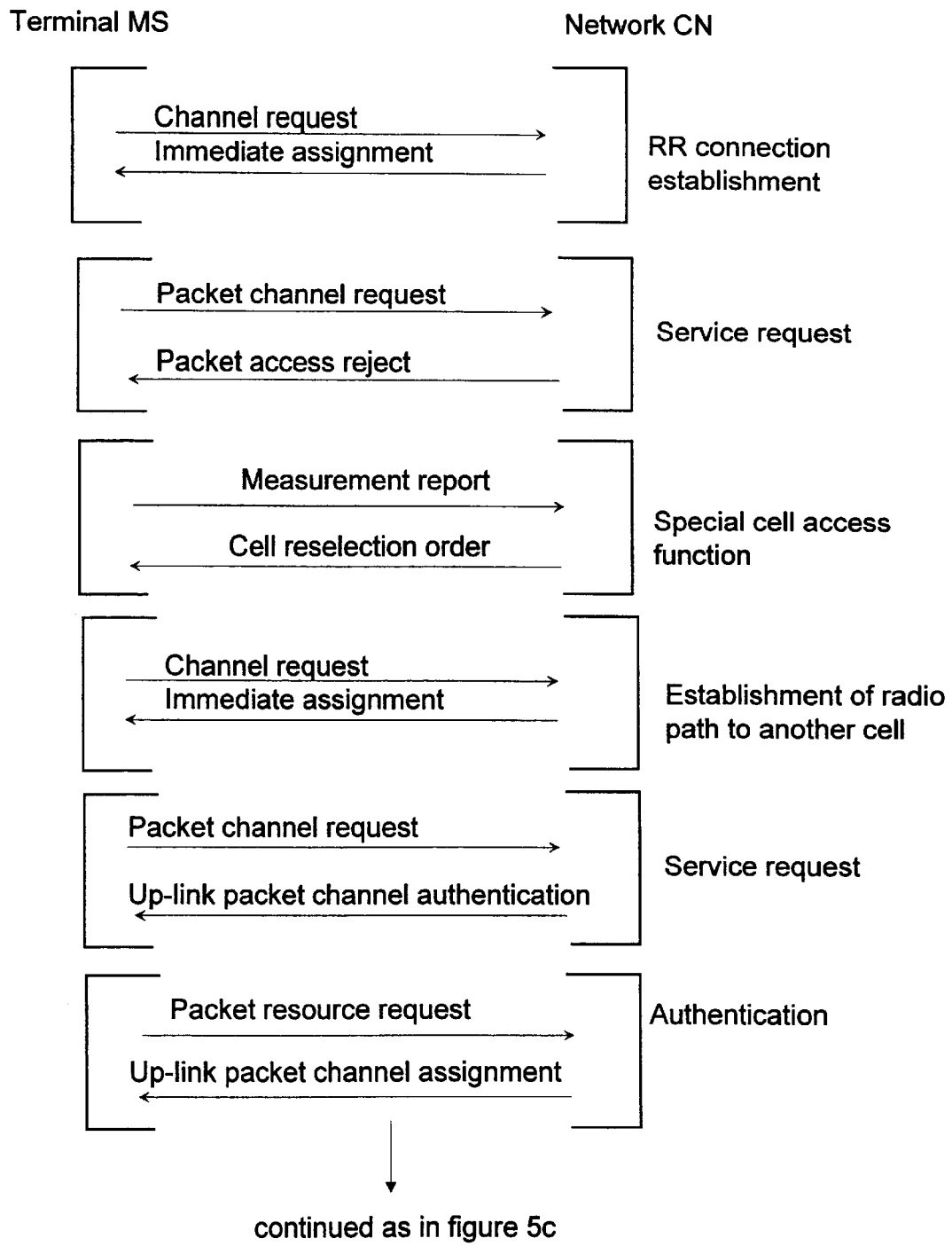
FIG. 5d shows in a signal diagram how the connection between a terminal and the network is established, maintained and disconnected when operating according to the invention in a congested cell supporting GPRS services.

FIG. 5d shows how the situation can be improved in a cell suffering from lacking resources by acting according to the second embodiment of the invention. A radio path connection is established between a terminal and the network in the prior art manner. Then the terminal transmits according to the standard a packet channel request. If the cell does not have resources for the terminal in order to use the GPRS packet data services, then according to the standard the network transmits to the terminal on the PCCCH channel (Packet Common Control CHannel) a packet access reject message. In the operation according to the second embodiment of the invention the idea to offer the terminal a possibility to access another cell is included in said packet access reject message by including in said message a request to transmit the neighbor cell measurement information to the base station. The addition according to the invention is made in a message addressed to a particular, single terminal. Below there is an exemplary illustration of how the additional information required by the invention can be transmitted to a particular terminal in the packet access reject message, as expressed by its information elements:

<Packet Access Reject message content>::=
    <MESSAGE_TYPE: bit(6)>
    <PAGE_MODE : bit(2)
    <Reject : Reject struct>
    <spare padding>
<Reject struct>::=
    {L<TLLI :bit(32)>
    |H{L<Packet Request Reference :
        Packet Request Reference IE
      |H <Global TFI :Global TFI IE>}}
    {0|1 <WAIT_INDICATION :bit(8)>
        <WAIT_INDICATION_SIZE : bit(1)>
    {0|1 <Measurement Report Request :bit(2)>}
    {0|1 <Reject :Reject struct>};

The information element "MESSAGE_TYPE" indicates with six bits the nature of the message. The information element "PAGE_MODE" indicates with two bits the nature of the transmitted request; whether it concerns a normal paging, an extended paging, paging reorganization, or a previously sent request. The modification required by the invention is included in the next section "Reject struct" of the message with a information element "TLLI" (Temporary Logical Link Identity) at the beginning having a length of 32 bits, whereby this element contains the temporary identity number of the terminal. Information about which reference number is assigned to the packet mode data connection is transmitted in the information element "Packet Request Reference". The information element "Global TFI" (Temporary Flow Identifier) defines a particular transmitted data packet. The next information element "Wait_indication" indicates with eight bits how long the terminal must wait before it may transmit a new packet channel access request. Said time varies between 0 and 255 seconds. The next information element "Wait-Indication_Size" indicates the time unit used in the previous information element: "0" means seconds and "1" means a time unit with a length of 20 milliseconds. The next information element according to the invention, "Measurement Report Request" having a length of two bits, must be added to the message so that the system will operate according to the invention. The bit combination "0-0" orders the terminal to transmit to the network one measurement report which contains the level measurement information for the neighbor cells. The bit combination "0-1" orders the terminal to transmit two measurement reports.

When the terminal has transmitted the requested level measurement information of the neighbor cells to the base station of its current cell, then on the basis of the measurement results received by the network it can transmit to the terminal an order to change the cell (Cell Change Order) to a cell, which supports the GPRS packet data transmission service and whose loading permits the new terminal to be served by it, and which according to the level measurement information operates on an acceptable level, at least as estimated on the basis of the given offset parameters. Then the special cell access function presented in FIG. 5d is completed. From here onwards the operations for establishing a connection, data transmission and disconnection is according to existing specifications, as was presented in connection with FIG. 5c. Operation in a manner according to the second embodiment of the invention enables the network to control the resources offered by the different base stations so that as many terminals as possible can utilise the GPRS packet data transmission services within a certain geographical area. Thus the whole network uses its resources more efficiently compared to the prior art operation which is able to offer a cell based service only.

Figure 6:
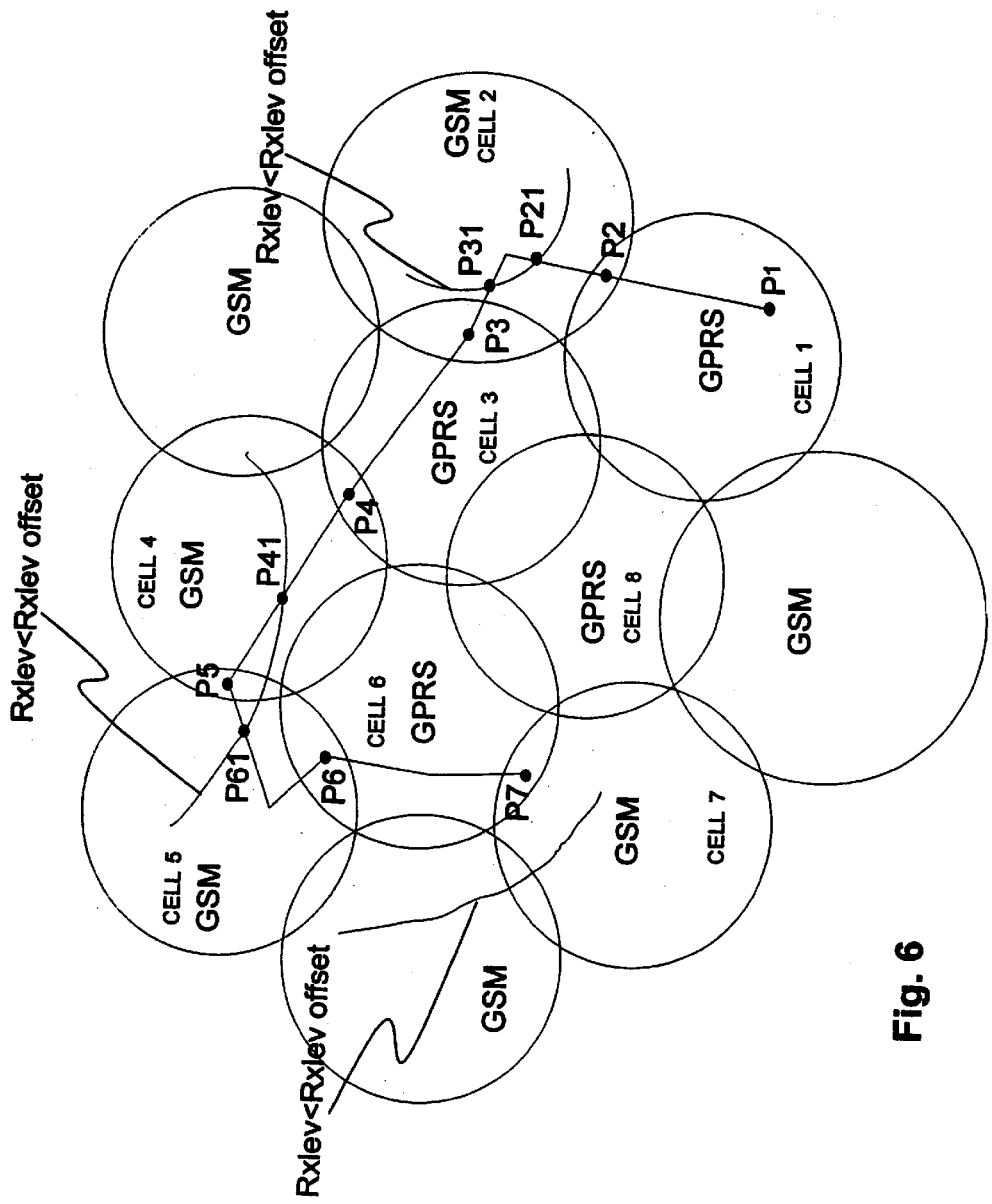
FIG. 6 shows cell reselection according to the invention in a GSM, GPRS system.

FIG. 6 shows how the method according to the invention improves the availability of the GPRS services compared to the situation presented in FIG. 2. In the system according to the invention the network transmits to an particular terminal information about the neighbor cells around it. In the same way information about that the particular terminal is authorised to transmit, when required, a special cell access request in the above described manner, is transmitted to the terminal, if it gets in the area of a cell which does not support the GPRS services, or if the resources of the current cell are not sufficient to serve the terminal in question on a service level which it desires. Thus on the path P1→P7 the terminal can use the GPRS services of the cell 1 up to the point P21. On the distance P21→P31 the terminal can not be offered GPRS services, and thus it must accept the basic GSM services. However, already at point P31 the terminal is able to transmit a special cell access request to its current cell, whereby it will be offered the GPRS services of the cell 3 when the loading of cell 3 makes this possible. The next time the GPRS services are lacking on the distance P41→P6 1. On the rest of the path up to the end point P7 the GPRS services are available to the terminal. In a prior art system it is not possible to tell with certainty which cell, 6 or 7, the terminal will use in point 7. When the method according to the invention is used the terminal MS can with certainty stay as a user of the cell 6 which supports the GPRS services. In unfavourable conditions the network can use the already existing (the C values and their parameters described above) or any other new means in order to prevent unnecessary cell reselections.

Figure 7:
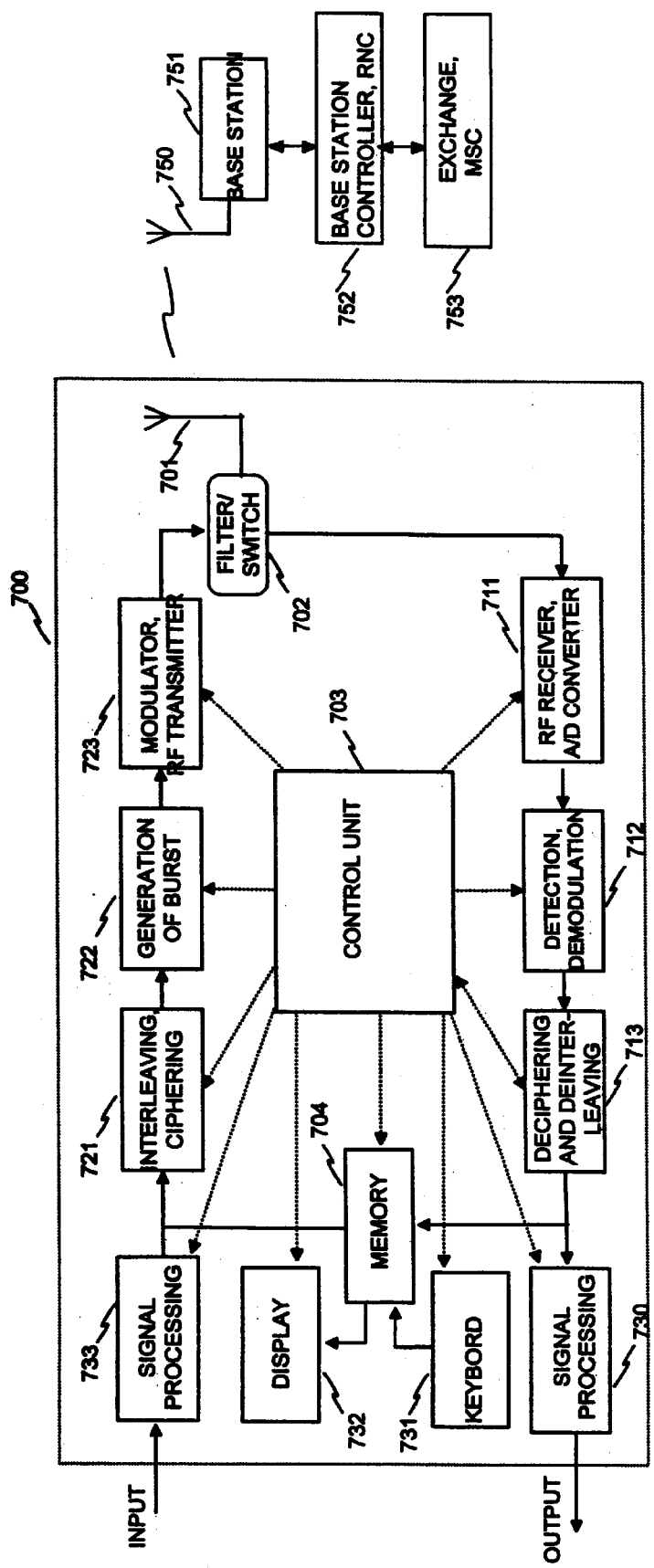
FIG. 7 shows the basic structure of a terminal according to the invention.

FIG. 7 shows in a simplified block diagram a terminal according to the invention, preferably a mobile station 700, and how it is connected to a cellular telephone network. The mobile station comprises an antenna 701 for receiving the radio frequency signals or RF signals transmitted by the base stations. A received RF signal is directed with the switch 702 to the RF receiver 711, where the signal is amplified and converted into a digital form. Then the signal is detected and demodulated in the block 712. The block 713 performs deciphering and deinterleaving. Then the block 730 performs the signal processing. The received data can be stored as such in the memory 704 of the mobile station, or alternatively the processed packet data is transmitted after the signal processing to any external device, such as a computer. The control unit controls the above mentioned reception blocks according to a program stored in the unit.

The transmission operation from the mobile station is performed for instance in the following way. Controlled by the control unit 703 the block 733 performs any signal processing of the data, and the block 721 performs interleaving and ciphering of the processed signal to be transmitted. The encoded data is formed into bursts, block 722, whereby in the block 723 the bursts are modulated and amplified into an RF signal to be transmitted. The RF signal to be transmitted is directed to the antenna 701 via the switch 702. The control unit 703 controls also the above mentioned processing and transmitting functions.

In a terminal shown in the FIG. 7 the essential parts regarding the invention are i.a. the reception blocks 711–713, which are prior art per se, through which the terminal receives, demodulates and decodes the messages transmitted by the base station and measures the signal power levels of the received signals, and the control block 703 which processes the information contained in the messages and controls the functions of the terminal. A part of the terminal's memory 704 must allocated for information concerning neighbor cell reselection, this information being the information about the BCCH frequencies of the neighbor cells and about the service level offered by them. For the same purpose it is of course possible to use a detachable memory means associated with the terminal, such as a SIM card known per se. With the aid of the transmission blocks 721–723 the terminal transmits the special cell access request and the messages associated with cell reselection to the base stations. Compared to prior art the invention imposes rather insignificant requirements on the equipment of the base stations and the terminals. The base station 751 and/or the base station controller 752 have at their disposal a data base (not shown in FIG. 7), which contains the information about the neighbor cells and the BCCH frequencies used by them, as well as about the service level provided by them, such as their ability to provide GPRS services. The operator generally has so called OM facilities (Operation & Maintenance) for changing the contents of these data bases on a so called static or permanent basis (for instance when a new base station is commissioned adjacent to older base stations), or dynamically (for instance when some adjacent base station is run down for maintenance). The prior art base stations generate and transmit messages of many different kinds, so that with the aid of prior art means 751, 752 it is possible to generate and transmit messages which relate to the information contained in the data base.

The above presented embodiments are of course exemplary, and they do not limit the application of the invention. Particularly it must be noted that even if the above presented examples are associated with the GSM and GPRS systems it is possible to apply the system in any other digital cellular system. Particularly we can mention DCS1800 (Digital Communications System at 1800 MHz), IS-54 (Interim Standard 54) and PDC (Personal Digital Cellular). Particularly in the future so called third generation digital cellular systems the service level offered by the cells to the terminals may vary considerably from one cell to the next one. Proposals for the third generation systems are UMTS (Universal Mobile Telecommunications System) and. FPLMTS/IMT-2000 (Future Public Land Mobile Telecommunications System/International Mobile Telecommunications at 2000 MHz). In these plans the cells are divided according to size and properties into cells of various sizes, and as an example of the service level we can use the data transmission rate. The highest data transmission rate is offered in picocells and the lowest in macrocells. The cells may be located partly or totally superimposed, and there may be terminals of different kinds, whereby all terminals are not necessarily able to utilise the service level offered by all cells. Thus the invention can be applied to transmit various information about the different services supported by the neighbor base stations as service signalling messages.

List of References:
ETSI 04.08 version 6.2.0 parts 7.1 and 7.3.2
ETSI 04.08 version 6.2.0 part 9.2.9 table 9.2.11
ETSI 04.08. version 6.2.0 part 10.5.3.3 table 10.5.91
ETSI 04.08. version 6.2.0 part 10.5.2.20 FIG. 10.5.47
ETSI 04.08. version 6.2.0 section 10.5.2.20
ETSI 04.08. version 6.2.0 section 9.3.7
ETSI 04.08. version 6.2.0 part 10.5.4.11 FIG. 10.5.95
ETSI 04.08. version 6.2.0 part 10.5.4.11 table 10.5.123
ETSI 03.64 version 6.1.0
ETSI 04.60 version 6.2.0
ETSI 05.08 version 6.4.0

What is claimed is:

1. A method for controlling cell reselection in a service network, in which method
a base station (BS, 751) transmits to a terminal (MS, 700) information about the current cell and about at least one neighbor cell,
the terminal performs neighbor cell measurements for cell reselection, and
a decision concerning cell reselection is made on the basis of said measurement results, the loading situation of the network, and the service requirements of the terminal,
wherein the terminal is authorized to perform a special cell access, and that for the cell reselection required by the special cell access the terminal transmits to the base station an additional message which comprises the results of the neighbor cell measurements made by the terminal.

2. The method according to claim 1, wherein the neighbor cell measurement information is transmitted on the basis of a transmission request addressed by the network to the terminal.

3. The method according to claim 2, further comprising transmitting the request for the transmission of the neighbor cell measurement results in a GPRS service network in a signaling message to the terminal,
wherein the request for the transmission comprises:
an indication of the nature of the signaling message;
an indication of the nature of the request;
a temporary identification number of the terminal;
information about a reference number assigned to a packet mode data connection for transmitting the signaling message;
a definition of a particular data packet of the signaling message;
an indication of how long the terminal must wait before transmitting a subsequent special access request; and
an indication of a number of measurement reports requested.

4. The method according to claim 3, wherein the indication of a number of measurement reports requested comprises a combination of bits, and a bit combination of "0—0" signifies a request for one report, and a bit combination of "0–1" signifies a request for two reports.

5. The method according to claim 1, wherein the information about permitting a special cell access is transmitted to the terminal as a message relating to the particular terminal.

6. The method according to claim 5, further comprising transmitting the information about permitting a special cell access in the GSM service network in the SI/PSI message to the terminal,
wherein the information about permitting a special cell access comprises:
an indication that the terminal is or is not allowed to transmit the special cell access request;
an indication of a limit of a measured signal level of a received beacon frequency;
an indication of a mode in which the terminal utilizes cell reselection;
an indication that additional cell service information is cell related or region related; and
offset parameters of a reception level for the mode.

7. The method according to claim 1, wherein the authorization to a special cell access is assigned on the basis of a special cell access request transmitted by the terminal to the base station.

8. The method according to claim 7, wherein the neighbor cell measurement information is transmitted on the initiative of the terminal in connection with the special cell access request.

9. The method according to claim 8, wherein performing a special cell access request is permitted to the terminal when it is connected to a special service.

10. The method according to claim 9, wherein the special service required by the terminal is the GPRS service.

11. The method according to claim 7, wherein permission to make a special cell access request is given to the terminal on a regional basis.

12. The method according to claim 7, wherein the network realizes a cell reselection according to the special cell access request if this is permitted by the offset parameters of that cell, in which the terminal requires to remain a user or which the terminal requests to access as a user.

13. The method according to claim 7, wherein the special cell access request made by the terminal to the base station of its current cell comprises a cell reselection request.

14. The method according to claim 7, wherein the special cell access request made by the terminal to the base station of its current cell comprises a request to remain a user of its current cell.

15. The method according to claim 13, wherein said special cell access request is included in "CM service type" information element of the service request message transmitted by the terminal.

16. The method according to claim 15, wherein the four bit combination a cell "1-1-0-0" of said information element represents a special cell access request.

17. The method according to claim 13, wherein an information element "Special cell access" is added to the service request message transmitted by the terminal in order to realize said special cell access request.

18. The method according to claim 17, wherein said information element comprises information about how many neighbor cells' information are included in the message, the identity code (BSIC) of said neighbor cells, information about the beacon frequencies of said cells and the level measurement information (RXLEV) of the signals transmitted by the base stations of said cells.

19. The method according to claim 18, wherein the number of said neighbor cells is four.

20. The method according to claim 1, wherein when a base station of the cellular network has received a special cell access request from a terminal it decides whether it will permit the operation required by said special cell access request to be executed, and transmits the information about the decision it made in the signaling message to said terminal.

21. The method according to claim 20, wherein said decision is transmitted to the terminal in the disconnect message of the GSM signaling.

22. The method according to claim 21, wherein the disconnect message contains as a cause value the information that either the required operation is permitted, or that the required operation is prevented.

23. The method according to claim 22, wherein said information is included in the disconnect message in a "cause value" information element of the disconnection cause.

24. The method according to claim 23, wherein in the "cause value" information element the message number 7 and its value "0-0-0-0-1-1-1" permits the requested operation, and that in the "cause value" information element the message number 45 and its value "0-1-0-1-1-0-1" prevents the requested operation.

25. The method according to claim 21, wherein the disconnect message contains information about the identity code (BSIC) of and the beacon frequency used by that base station, which the terminal is permitted to access as a user or in which the terminal is permitted to stay as a user.

26. The method according to claim 25, wherein the information about the identity code (BSIC) and the beacon frequency of a base station are included in a "diagnostic(s) if any" information element.

27. The base station (BS, 751) of a cellular radio system, the base station comprising means for providing a certain service (GSM, GPRS) and means for generating and transmitting signaling messages to terminals (MS, 700), wherein it comprises means for processing a special cell access request, it comprises information about which base stations are available to the terminal so that it can move the terminal to be a user or remain a user of one of these base station, and it is arranged to include said information regarding both a permitted special cell access request and a cell reselection, into the signaling messages addressed to the terminal.

28. The base station according to claim 27, wherein said signaling message is transmitted as a signaling message according to a certain service.

29. The base station according to claim 27, wherein said service is the GPRS packet data transmission service.

30. A terminal (MS, 700) of a cellular radio system, the terminal being provided with means for accessing a certain service (GSM, GPRS) and comprising means for receiving signaling messages from base stations (BS, 751) and means for making measurements relating to particular cells in order to find a suitable cell for making a special cell access request, wherein it is provided with means for making a special cell access request to the base station of the current cell, means for receiving and interpreting cell reselection information from the signaling messages transmitted by the base station, and means for making said cell reselection on the basis of said information.

31. The terminal according to claim 30, wherein it comprises means for receiving signaling messages according to a certain service (GPRS), and that said signaling message is a signaling message according to the certain service.

32. The terminal according to claim 30, wherein said service is the GPRS packet data transmission service.

33. A cellular radio system comprising base stations (BS, 751) and cells (1–8) related to the base stations, and terminals (MS, 700), and in which system the base stations are provided with means for generating and transmitting messages as signaling messages to the terminals, and the terminals are arranged to operate on a certain service level (GSM, GPRS) and to receive signaling messages from the base stations, wherein it comprises information available to the base station concerning a number of neighbor cells adjacent to the cell of said base station and containing information about the service level provided to the terminals by the neighbor cells in said neighbor cells, whereby said system is arranged to transmit, after a special cell access request has been received, said information from the base station in a signaling message to the terminal for selecting a new serving cell.

34. The cellular radio system according to claim 33, wherein the base stations are provided with means for generating and transmitting messages as signaling messages of a certain service level to the terminals, the terminals are arranged to operate on a certain service level (GPRS) and to receive signaling messages of a certain service level from the base stations, and said signaling message is a signaling message according to a certain service (GPRS).

* * * * *